Dec. 1, 1931.  E. J. W. RAGSDALE  1,834,642
AIRCRAFT CONSTRUCTION AND METHOD OF MAKING SAME
Filed Feb. 7, 1930  2 Sheets-Sheet 1
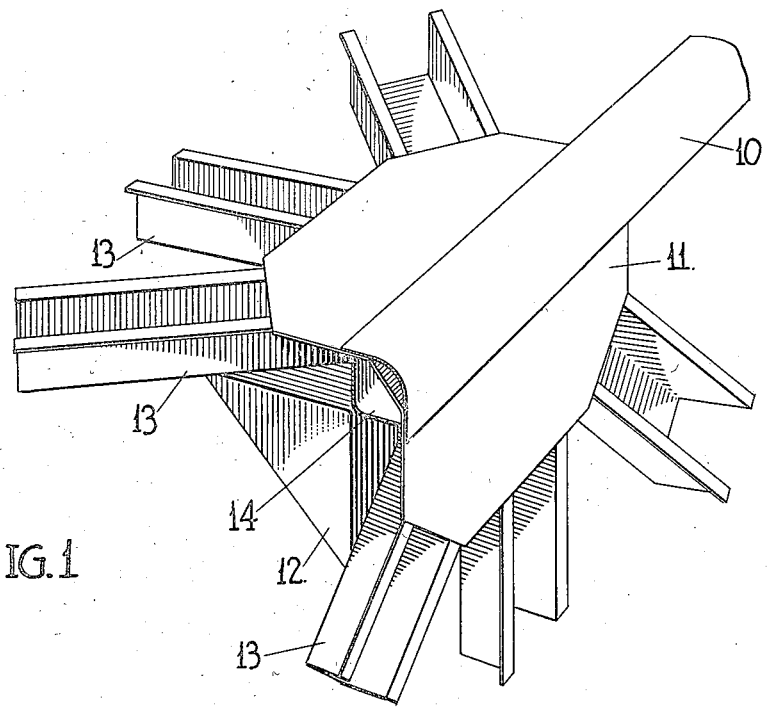
FIG.1
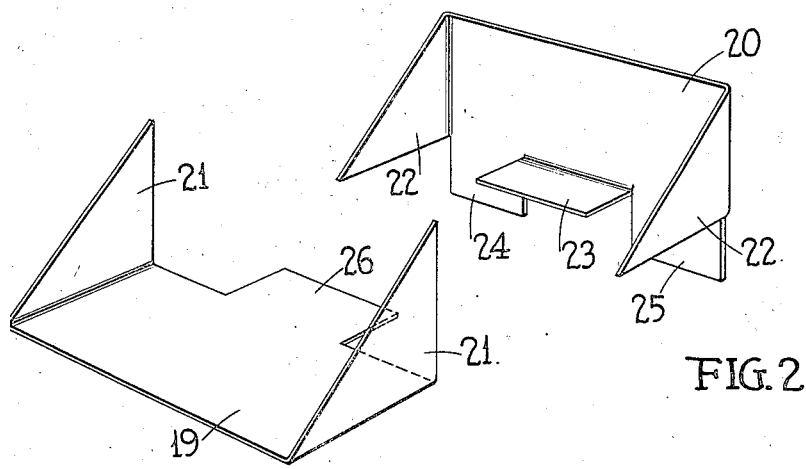
FIG.2.
FIG.3
INVENTOR.
EARL J. W. RAGSDALE.
BY
*John P. Barbo*
ATTORNEY.

Dec. 1, 1931.  E. J. W. RAGSDALE  1,834,642
AIRCRAFT CONSTRUCTION AND METHOD OF MAKING SAME
Filed Feb. 7, 1930  2 Sheets-Sheet 2

INVENTOR.
EARL J. W. RAGSDALE
BY John P. Tarbox
ATTORNEY.

Patented Dec. 1, 1931

1,834,642

UNITED STATES PATENT OFFICE

EARL J. W. RAGSDALE, OF NORRISTOWN, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

AIRCRAFT CONSTRUCTION AND METHOD OF MAKING SAME

Application filed February 7, 1930. Serial No. 426,472.

My invention relates to a sheet metal joint construction, the invention having particular reference to joint constructions suitable for structural truss work, such as is common in aircraft construction.

It is a main object of my invention to provide a joint construction of this kind which can be readily assembled, which is adaptable to a variety of conditions, which can be made at low cost, which is very strong and durable, and which combines all these characteristics with extremely light weight.

I attain this object in large part by utilizing in the construction of the joint and the parts entering into it of light gauge rustless alloy steel of high physical characteristics, giving it very small weight for its strength, and by electrically spot welding the parts together in the assembly. Spot welding is probably the fastest known process of joining parts together by individual separated fastenings. It is probably also the cheapest known way of making the joints of structures having sections of widely varying form at the joints. The joint made by spot welding is also a weightless joint and is made without cutting into and weakening the metal at the joint.

The form of the members entering into the joint and the manner in which they are assembled enables me to use this efficient form of joinder to very good advantage.

Generally, the invention consists in a joint construction such as is particularly applicable to the construction of airplane fuselages or other like closed truss structures. It may comprise a main member, such as the longéron of an airplane fuselage, which is built up of inner and outer members to form a hollow closed section, the inner member being of substantially angular cross section having edge flanges, and to this member inner and outer gussets are readily secured through the wide surfaces presented before it is closed by the outer member. These gussets are adapted, particularly the inner one, to strongly reinforce the joint, and to receive between them the ends of transverse and diagonal frame members for secure joinder to the main member through the gussets.

One form of the detailed construction by which the objects and advantages of my invention are achieved is illustrated in the accompanying drawings, in which Fig. 1 is a perspective view, looking at it from the outside, of a joint construction according to my invention.

Figs. 2 and 3 are, respectively, perspective views of the two stampings which, when combined, form the novel inner gusset of the invention.

Figure 4:
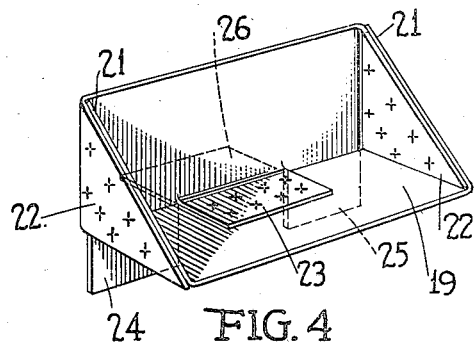
Figs. 4 and 5 are, respectively, a perspective view of the assembled inner gusset, and an end view thereof.

In the drawings, 10 represents generally the main member entering into the joint of my invention, such as the longéron of an airplane fuselage, 11 represents the outer gusset, 12 represents the inner gusset, and 13 represents auxiliary transverse and diagonal frame members entering into the joint. The number and the direction in which these auxiliary members extend will, of course, vary with the type of trussed structure in which the joint is used, the nature of the stresses to which it is subject, and the transverse sectional and longitudinal contour of the trussed structure.

According to my invention I may form the main or chord member 10 of an inner member 14 having outwardly extending flanges each and having outwardly turned edge flanges 15 and 16. The sides 17, 18 of the angle form wide seats for the securement of the inner gusset 12 and the outer edge flanges 15 and 16 provide similar seats for the securement of the outer gusset.

An important feature of my invention is the strongly reinforced inner gusset 12 and the manner in which it is formed and secured to the other members of the joint.

Figure 5:
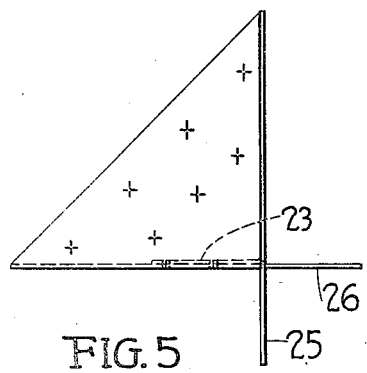

As shown in the assembled views of Figs. 4 and 5, it is generally of X cross section when seen in end elevation, and is built up of two complemental sheet metal stampings 19 and 20, shown separately in Figs. 2 and 3. The stampings 19 and 20 have their ends formed with laterally extending triangular portions 21, 22.

In the case of the stamping 20, the body portion thereof is extended beyond the portions 22 and is slitted and the central portion 23 bent outwardly at right angles to the body of the stampings, providing lateral extensions 24 and 25 in the plane of its body.

In the case of the stamping 19, only the central portion of the body thereof is extended to form an extension 26 of a width substantially equal to the distance between the extensions 24, 25 of the stamping 20.

The two stampings so formed are telescoped together as shown in Figs. 4 and 5 and secured together through their overlapping triangular lateral extensions 21, 22 and through the extension 23 overlapping the body of stamping 19, by spot welding these overlapped parts together.

So assembled, the main bodies of the stampings 19, 20 form the two adjacent long arms of the generally X-section gusset, while the extensions 24, 25 and 26 form the adjacent shorter arms. The overlapped triangular lateral extensions 21, 22 form a strong means bracing the sides of the angle of the gusset formed by the bodies of the stampings.

Figure 6:
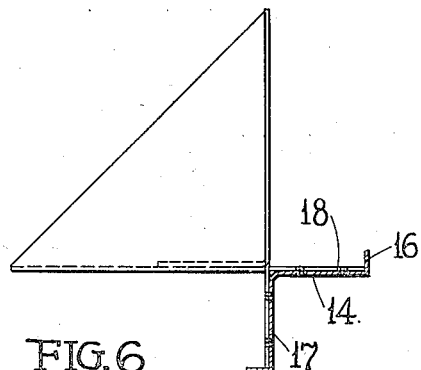
Fig. 6 is a transverse section through the inner member of the main frame member, showing the inner gusset assembly applied thereto.
Figure 7:
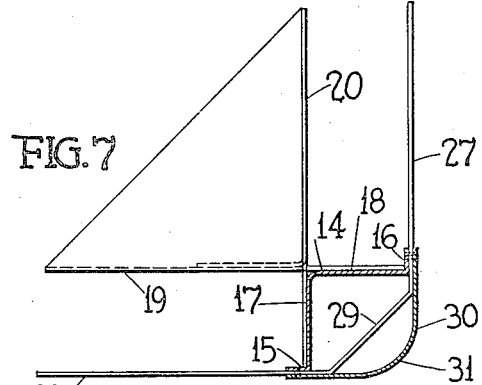
Fig. 7 is a similar section showing the inner and outer gussets and outer member of the main frame member all in assembled relation.
Figure 8:
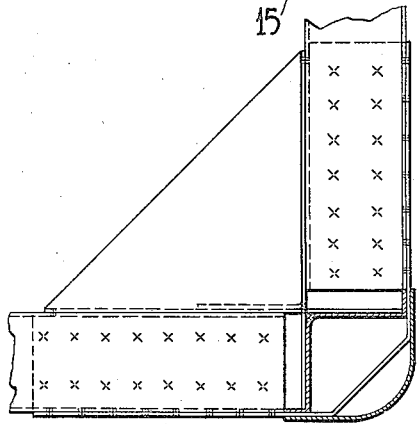
Fig. 8 is a similar section through the joint showing transverse and diagonal frame members joined to the gussets and through them to the main member.
Figure 9:
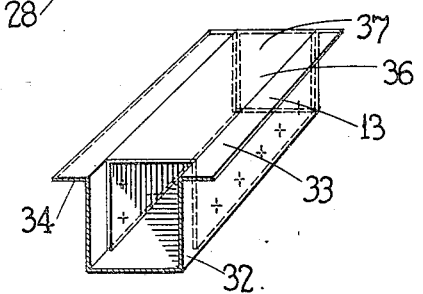
Fig. 9 is a detail view showing the structure of the end of a transverse or diagonal frame member.

The gusset 12 so formed is then secured to the inner side of the angular main element 14 of the chord 10 by nesting the parts as shown, in Fig. 6, and spot welding the extensions 24, 25 and 26, respectively, to the side walls 17, 18 of the angle of the main element 14.

After these parts have been so secured together, the outer gusset 11 comprising the angularly arranged side walls 27 and 28 connected by a diagonal portion 29 is applied to the outer open side of the main chord element 14 and secured thereto by spot welding the walls 27 and 28, respectively, to the flanges 16 and 15. The outer angular member 30 having the rounded corner, may then be applied to the outer gusset with its sides engaging the sides 27 and 28 of this gusset.

The sides of this angular member 30 may then be welded through these sides 27 and 28 to the flanges 15 and 16 on the main member so that the three thicknesses of metal adjacent the flanges 15 and 16 are welded into one. At points beyond the gussets 29, the metal of the outer angular member 30 of the main chord is brought inwardly and welded directly to the flanges 15 and 16.

As desired, this member 31 may be applied at this stage of the assembly, or after the auxiliary truss members 13 have been applied and secured to the gusset members 11, 12.

Since the auxiliary truss members 13 may all be constructed in the same way and joined to the gussets and through them to the main chord member 10 in the same way, except that they extend in different directions, the description of one such member and its method of securement will suffice for all.

Figure 10:
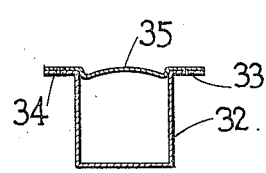
Fig. 10 is a transverse sectional view through a transverse or diagonal frame member, when closed by a member secured across the mouth of the channel section.

A member 13 may be of hollow closed section as in the case of main chord 10 and built up of a main channel member 32, having edge flanges 33, 34, see Fig. 10, closed by a substantially flat ribbed plate 35, spot welded to the flanges 33, 34. At the end where the member extends into overlapping relation with the adjacent walls, as 20 and 27, respectively, of the inner and outer gussets, this closing plate is omitted and there is substituted for it an inwardly facing channel member 36, the side walls of which are spot welded to the side walls of the channel 32, and its bottom wall, 37 is flush with the edge flanges 33, 34.

The end of the member 13 just fits into the space between two adjacent walls, as 20 and 27 of the inner and outer gussets, and overlaps them through a relatively large area through which the member 13 is spot welded to the gussets. The flanges 34 and 33 are readily spot welded to the gusset side wall 27 and, by entering a suitable welding electrode from the open inner end of the hollow closed end portion of the truss member 13 the bottom wall 37 of the channel 36 may likewise be spot welded to the wall 27. To facilitate this, the cover member 35 is preferably left off until the truss 13 is secured to the gussets. The truss 13 is secured to the body 20 of the inner gusset by spot welding the bottom wall of the channel 32 to the body of the gusset.

It will be seen that by this construction an exceedingly strong and adaptable joint is provided, yet one which is very light and hence well adapted for aircraft work.

While I have herein described a specific embodiment of my invention, it will be understood that changes and modifications may be made without departing from the spirit and scope of the invention, and such changes and modifications are intended to be covered in the following claims.

What I claim is:

1. A sheet metal joint construction, comprising a main member of outwardly open section flanged at its edges, an outer angular section gusset applied to said member and secured to said outwardly extending flanges, an inner gusset of angular section having extensions beyond the angle thereof overlapping and secured to the inner surfaces of the angle section main member, and means bracing the opposite sides of the angle of the gusset, the space between the outer and inner gussets receiving transverse and diagonal braces secured to both gussets.

2. A sheet metal joint construction, comprising a main member of outwardly open section, and a two-part gusset of angular section and having portions extended beyond the angle thereof and overlapping the respective inner surfaces of said angle section member and secured thereto, said gusset parts having portions extending between the sides of the angle and secured thereto.

3. A sheet metal joint construction, comprising a main member having a portion of angle cross section, an angular gusset braced betwen the side walls of the angle and facing in a direction opposite the angle of said member, and having portions of the walls of its angle extended to overlap the sides of the angle of said member and secured thereto.

4. A sheet metal gusset for use in joining meeting frame members comprising two stampings, the main bodies of which form an angle with each other, each of said stampings having end extensions transverse to the bodies thereof, and overlapping and secured together to interbrace the main bodies of the stamping, a portion of the main bodies of each of said stampings being extended beyond the angle to provide means for securing the gusset to a frame member, a portion of the extended portion of one of said stampings being bent over and secured to the body of the other stamping.

5. A sheet metal gusset for use in joining meeting frame members comprising two stampings having their main bodies arranged at an angle to each other, one of said stampings having a central portion of its main body extended beyond the angle formed by the bodies of the stampings and the other stamping having its side portions between which the central portion of the other stamping is received similarly extended, the central portion of the last-named stamping being bent over and secured to the body portion of the other stamping, the lateral extremities of the stampings being formed with overlapped triangular extensions laterally of the bodies thereof secured together and interbracing the angle section formed by the main bodies of the stampings.

6. A sheet metal joint comprising a main outwardly presenting open angular member, an outer gusset secured over the mouth of said angular member, an inner gusset of generally X cross section secured to the inner faces of the angle member through two of the arms of the X and having the other arms of the X extending in the same general direction as the sides of the outer gusset, whereby the ends of frame members connected to the main member may be inserted between the space between the walls of the gussets and secured thereto.

7. A sheet metal joint comprising a main outwardly presenting open member flanged at its outer edges, an outer gusset bridging the mouth of said member and secured to said flanges, an inner gusset secured to the inner wall of said member, a flanged channel frame member reinforced at its ends by an inverted channel member nesting with and secured to the side walls of said channel, the reinforced end of the channel extending between portions of the outer and inner gussets and secured thereto through the bottom walls of the channels and the edge flanges of said first-named channel.

8. A hollow transverse frame member for joinder to a longitudinal member having spaced gussets secured thereto to receive the end of said transverse member formed of flanged channel section member and having its end reinforced by a reversely presenting channel member secured to the side walls of the first-named member and having its bottom wall in the plane of the edge flanges of said first-named member.

9. A device for joining structural members having surfaces disposed at an angle to each other comprising a two-part gusset formed of sheet material having parts extending inwardly of the sides of the angle formed by said surfaces, said parts being overlapped and welded to each other.

10. A sheet metal joint construction, comprising a main member of angle section and a two-part gusset of angular section and having portions extended beyond the angle thereof and overlapping the respective inner surfaces of said angle section member and secured thereto.

In testimony whereof I hereunto affix my signature.

EARL J. W. RAGSDALE.